Sept. 2, 1930.  S. H. BARBER  1,775,059
WIRE STRETCHER
Filed March 13, 1929
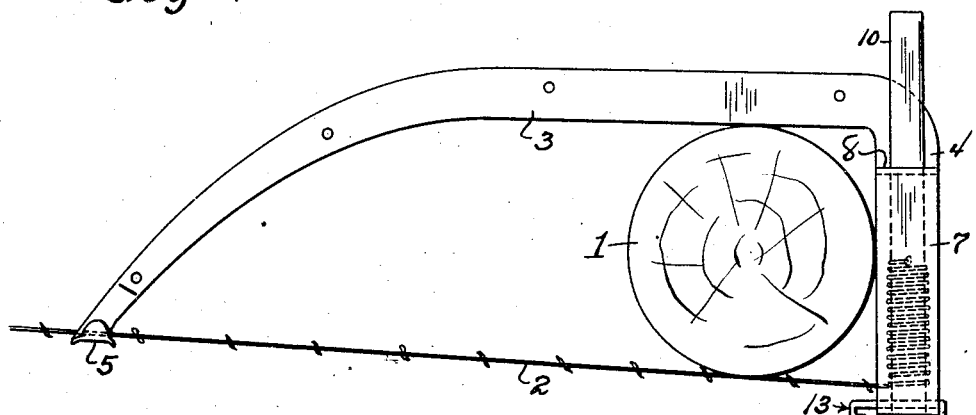
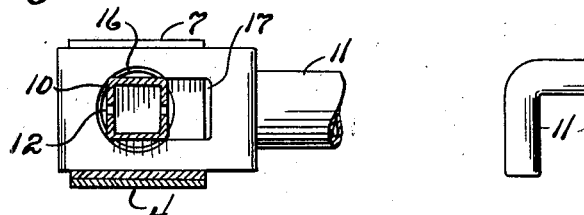
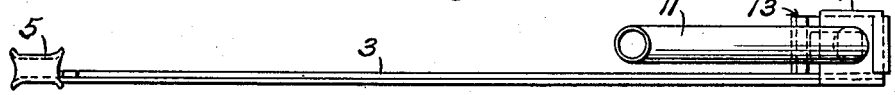
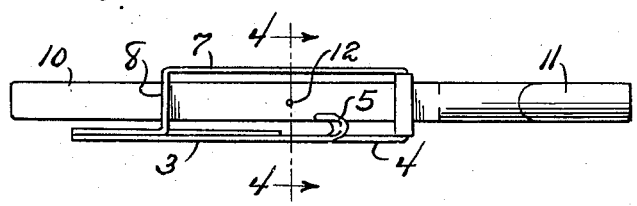
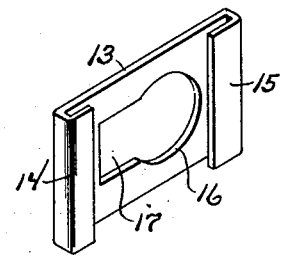
Samuel H. Barber
INVENTOR
BY Victor J. Evans
ATTORNEY Patented Sept. 2, 1930

1,775,059

UNITED STATES PATENT OFFICE

SAMUEL H. BARBER, OF KIM, COLORADO

WIRE STRETCHER

Application filed March 13, 1929. Serial No. 346,725.

My present invention has reference to a wire stretcher that is designed for stretching barb line wires for fences and the primary object of this invention is the provision of a simple device for this purpose which serves as a guide for the wire, a means for winding the free end of the wire to draw the same taut, together with means for locking the device against a fence post when both stretching the wire and after the same is stretched so that the stretched wire can be secured by the usual staples to the post.

To the attainment of the above broadly recited objects and many others which will present themselves as the nature of the invention is better understood, the improvement further resides in certain other novel features of construction, combination and operative association of parts, one satisfactory embodiment of which is disclosed by the accompanying drawings.

In the drawings:

Figure 1 is a plan view of the improvement in operative position.

Figure 2 is an edge view thereof.

Figure 3 is an end view thereof.

Figure 4 is a sectional view approximately on the line 4—4 of Figure 3.

Figure 5 is a perspective view of the slidable latch.

In the drawings, the numeral 1 designates a post against which a barb wire 2 is to be stretched and stapled.

In carrying out my invention I contemplate the employment of an angle member which, in the showing of the drawings, is constructed of a single plate that comprises two thicknesses. The longer arm of the improvement is indicated for distinction by the numeral 3, and the shorter arm by the numeral 4. The longer arm has its outer portion curved in the direction of the end of the arm 4 and the end of the said arm 3 merges into a cross sectionally U-shaped guide 5 for the wire 2. By reference to the drawings it will be seen that the ends of the guide are rounded outwardly. The arm 4 has its outer end extended at a right angle to the portion 3, as indicated by the numeral 6 and this angle portion or end is provided with a longitudinal extension 7 which has its end bent downwardly, as at 8, and connected to the arm proper. The member 7 and the ends 6 and 8 thereof provide the arm 4 with a substantially rectangular portion which I will hereinafter refer to as a cage.

The ends of the cage are provided with openings for the reception of a shaft 10 which is square in cross section. This shaft has its outer end rounded and cranked to provide the same with a handle 11. The shaft 10 has an aperture 12 therethrough, and through this aperture the free end of the wire 2 is passed. It will be apparent that by turning the crank 11 the shaft 10 will be rotated in the cage and the wire will be wound around the said shaft as disclosed by the dotted lines in Figure 1 of the drawings. The cage not only serves as a support for the shaft but as a guide for the wire.

The shaft is susceptible of longitudinal movement through the openings in the ends of the cage and this is essential for the reason that such movement of the shaft will permit of a comparatively great length of wire being wound therearound and likewise permits of the improvement being employed for stretching wires against different sized posts 1. The guide 5 and the frictional contact of the arms 3 and 4 with the outer and inner faces of the post 1 will effectively sustain the improvement on the post when the wire is being stretched. After the wire has been drawn taut the same must be connected to the post by the usual staples and in order to hold the shaft 10 from turning I arrange on the inner face of the end 6 of the cage a slidable latch. The latch is in the nature of a plate 13 that has its ends formed with inwardly directed lips 14 and 15, respectively. The body of the plate is provided with a key-hole opening, the wider and rounded passage of which is indicated by the numeral 16, and the restricted longitudinal passage by the numeral 17. The plate is slid so that the lip 15 will engage with the outer edge of the end 6 of the cage 7 when the shaft is rotated or permitted to turn on the cage. When the wire is drawn taut and the shaft is to be locked, the latch plate 13 is moved to bring its lip 14 into engagement with the inner edge of the end 6 of the cage and thereby bring the squared shaft into the squared passage 17 of the latch, so that the shaft will thus be effectively held from turning and the device locked on the post to permit of the fastening of the wire to said post.

Obviously the wire is cut after the fastening thereof, it being understood that the device is arranged upon the end post of the fence. When the device is again required for use the wire that is wound on the shaft is removed therefrom and a second wire is passed through the aperture 12 and the improvement operated in a manner as above described.

The simplicity of my construction and the advantages thereof will, it is thought, be apparent so that further detailed description will not be required.

Having described the invention, I claim:

A wire stretcher designed to be arranged against the end post of a fence, and comprising an angle member, one of whose arms is rounded and which merges into a cross sectionally U-shaped guide for a wire strand, the second end contacting with the post and being provided with a substantially rectangular cage whose ends are formed with openings, a cross sectionally square shaft journaled in and longitudinally movable through the cage, the outer end of the shaft being cranked to provide the same with a handle, said shaft having an aperture therethrough for the reception of the end of a fence wire and whereby the turning of the shaft will wind the wire therearound and the longitudinal movement of the shaft through the cage will permit of a comparatively great length of wire being so wound on the shaft, and a plate having lipped ends slidably arranged on the outer end of the cage, said plate having a key hole slot therethrough for the passage of the shaft, and said plate being adapted, when moved to one position to bring the round passage of the key hole opening in a line with the shaft and when moved in a second direction to bring the shaft into the restricted passage to cause the latter to contact with the walls thereof and to prevent the said shaft from turning.

In testimony whereof I affix my signature.

SAMUEL H. BARBER.